US008161177B2

(12) United States Patent
Robbins

(10) Patent No.: US 8,161,177 B2
(45) Date of Patent: Apr. 17, 2012

(54) FORMULATING MULTIMEDIA CONTENT OF AN ON-LINE INTERVIEW

(75) Inventor: James E. Robbins, Efland, NC (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 11/769,228

(22) Filed: Jun. 27, 2007

(65) Prior Publication Data

US 2009/0006639 A1    Jan. 1, 2009

(51) Int. Cl.
*G06F 15/16* (2006.01)

(52) U.S. Cl. ........ 709/231; 709/219; 709/217; 709/218; 709/230; 348/14.02

(58) Field of Classification Search .......... 715/751, 715/753–758; 709/231, 204–207, 217–219, 709/230; 348/14.01–14.09, 14.1
See application file for complete search history.

(56) References Cited

U.S. PATENT DOCUMENTS

| 5,382,972 | A * | 1/1995 | Kannes ...................... 348/14.07 |
| 6,697,342 | B1 | 2/2004 | Smyth et al. |
| 6,782,412 | B2 * | 8/2004 | Brophy et al. ................ 709/204 |
| 7,012,901 | B2 | 3/2006 | Jagadeesan et al. |
| 7,103,669 | B2 | 9/2006 | Apostolopoulos |
| 7,310,730 | B1 * | 12/2007 | Champagne et al. ......... 713/163 |
| 7,353,255 | B2 * | 4/2008 | Acharya et al. ............... 709/204 |
| 7,653,705 | B2 * | 1/2010 | Gudipaty et al. ............. 709/218 |
| 7,808,521 | B2 * | 10/2010 | Lengeling et al. ......... 348/14.08 |
| 2003/0169330 | A1 * | 9/2003 | Ben-Shachar et al. ..... 348/14.09 |
| 2004/0164896 | A1 * | 8/2004 | Evans ...................... 342/357.07 |
| 2005/0180341 | A1 | 8/2005 | Nelson et al. |
| 2006/0104347 | A1 | 5/2006 | Callan et al. |
| 2007/0206090 | A1 * | 9/2007 | Barraud et al. ............ 348/14.02 |

OTHER PUBLICATIONS

Gu et al; Supporting Multi-Party Voice-Over-IP Services with Peer-to-Peer Stream Processing; MM'05; Nov. 2005;pp. 303-306; ACM 1-59593-044-2/05/0011; Singapore.

Gu et al; System and Method for Peer-to-Peer Multi-Party Voice-Over- IP Services; Dossier #YOR920060006; Mar. 10, 2006; pp. 1-3; International Business Machines Corporation.

* cited by examiner

*Primary Examiner* — Wing Chan
*Assistant Examiner* — Ruolei Zong
(74) *Attorney, Agent, or Firm* — H. Barrett Spraggins; Cynthia G. Seal; Biggers & Ohanian, LLP

(57) ABSTRACT

Formulating multimedia content of an on-line interview, including transmitting during the on-line interview, over a data communications network from a first client device to a second client device, a media stream of content from an interviewee; simultaneously with the transmitting of the media stream from the interviewee, recording the media stream from the interviewee in a media file on the first client device; recording during the on-line interview in a media file on the second client device, a media stream of content from an interviewer; transmitting after the on-line interview, from the first client device to the second client device, the media file containing the recorded media stream from the interviewee; and merging the recorded media files into a single media file on the second client device for transmission to viewers of the on-line interview.

15 Claims, 5 Drawing Sheets

FORMULATING MULTIMEDIA CONTENT OF AN ON-LINE INTERVIEW

BACKGROUND OF THE INVENTION

1. Field of the Invention

The field of the invention is data processing, or, more specifically, methods, apparatus, and products for formulating multimedia content of an on-line interview.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen considerable advancement is streaming media. Streaming media such as VOIP and IPTV are replacing regular phone calls for telephonic on-line interviews. When media streams are used in this manner, the transmission quality is sometimes poor. When multiple people are interviewed on-line, the volume levels frequently are not identical. It is currently possible to use software to control the audio levels but all the call streams transmitted across a network are typically merged into a single media file with no opportunity to repair the poor quality caused by the network transmission.

SUMMARY OF THE INVENTION

Methods, systems, and products are disclosed for formulating multimedia content of an on-line interview, including transmitting during the on-line interview, over a data communications network from a first client device to a second client device, a media stream of content from an interviewee; simultaneously with the transmitting of the media stream from the interviewee, recording the media stream from the interviewee in a media file on the first client device; recording during the on-line interview in a media file on the second client device, a media stream of content from an interviewer; transmitting after the on-line interview, from the first client device to the second client device, the media file containing the recorded media stream from the interviewee; and merging the recorded media files into a single media file on the second client device for transmission to viewers of the on-line interview.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
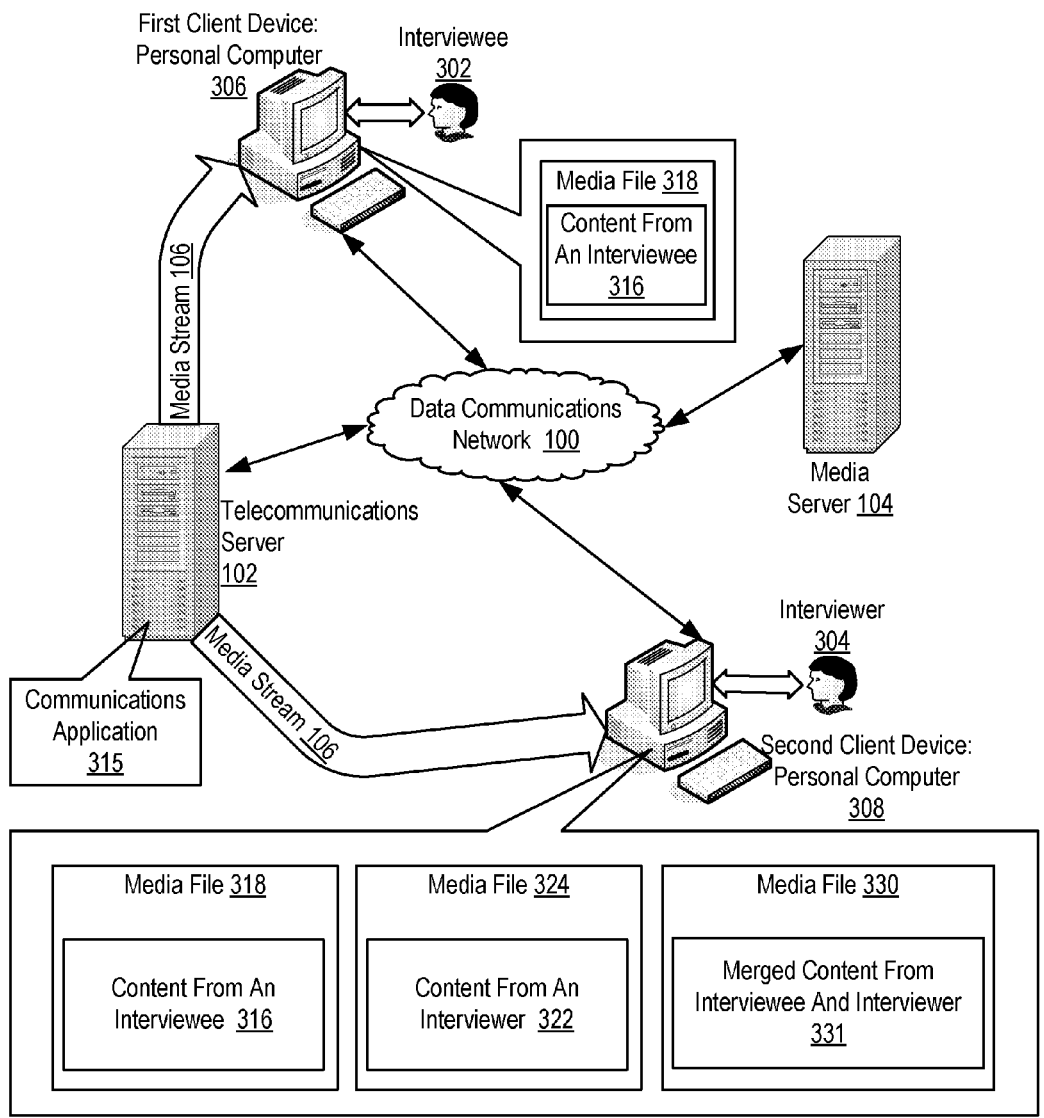
FIG. 1 sets forth a network diagram of a distributed computing system for formulating multimedia content of an on-line interview according to embodiments of the present invention.

Exemplary methods, apparatus, and products for formulating multimedia content of an on-line interview in accordance with the present invention are described with reference to the accompanying drawings, beginning with FIG. 1. FIG. 1 sets forth a network diagram of a distributed computing system for formulating multimedia content of an on-line interview according to embodiments of the present invention. The system of FIG. 1 includes a first client device (306) and a second client device (308). An interviewee (302) participates in an on-line interview through the first client device (306). An interviewer (304) conducts the on-line interview through the second client device (308). The client devices are client-side computers in a client-server architecture for distributed computing, in which data processing is carried out cooperatively among a number of computers, clients (306, 308) and servers (102, 104), linked together for data communications through a data communications network (100).

The system of FIG. 1 includes a telecommunications server (102) that implements a media stream (106) between the client devices (306, 308). The telecommunications server (102) is a server-side computer in the client-server architecture for distributed computing in the example of FIG. 1. The telecommunications server (102) has installed upon it a communications application (315), a module of computer program instructions that implements media streams for client devices according to data communications protocols for media streams.

The 'media stream' (106) is a transmission of multimedia content that is continuously received by, and normally displayed to, an end-user while it is being delivered by a provider. The term 'media stream' refers to the delivery method of the multimedia content rather than to the content itself The term 'media stream' is typically applied to transmissions of multimedia content that are distributed over telecommunications networks, because most other delivery systems are either inherently streaming, such as for example radio and television, or inherently non-streaming, such as for example books, video cassettes, and audio disks.

'Multimedia content' refers to multiple forms of information content and information processing, such as for example text, audio, graphics, animation, video, and interactivity, to inform or entertain an audience of users. 'Multimedia content' also refers to the use of electronic media to store and experience the multimedia content. Multimedia content is similar to traditional mixed media in fine art, but with a broader scope. Multimedia content means that computer information can be represented through audio, graphics, image, video, and animation in addition to traditional media such as text and graphics.

A media stream for multimedia content can be implemented in a number of forms, including, for example, VOIP and IPTV. VOIP stands for 'Voice Over Internet Protocol,' a generic term for routing speech over an Internet Protocol ('IP')-based data communications network. In a media stream implemented with VOIP, speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.' Many protocols are used to effect VOIP. The two most common types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses the Real Time Streaming Protocol ('RTSP') for transmitting the actual encoded speech. Similarly, H.323 is an umbrella recommendation from the standards branch of the International Telecommunications Union that defines protocols to provide audio-visual communication sessions on any packet data communications network.

'IPTV' stands for "Internet Protocol TeleVision," a system where a digital television service is delivered using the Internet Protocol over a network infrastructure, which may include delivery by a broadband connection. IPTV is provided in the form of broadband broadcasts over closed network infrastructures. IPTV is also provided in the form of TV content over the public Internet, sometimes referred to as TV over Internet or Internet Television. In businesses, IPTV may be used to deliver television content over corporate LANs and business networks. IPTV is television content that is received by the viewer through the technologies used for computer networks instead of being delivered through traditional television formats and cabling. IPTV requires either a personal computer or a "set-top box" connected to a television set. Video content for IPTV is typically compressed with a codec, MPEG-2 or MPEG-4 for example, and then sent in an MPEG transport stream delivered via IP Multicast in case of live TV or via IP Unicast in case of Video on Demand. IP Multicast is a method in which information can be sent to multiple computers at the same time. Typical data communications protocol utilization for IPTV includes Internet Group Management Protocol ('IGMP') for connecting to a media stream (TV channel) and for changing from one media stream to another (a TV channel change) and the Real Time Streaming Protocol ('RTSP') for data transmission.

The system of FIG. 1 operates generally to formulate multimedia content of an on-line interview as follows: The first client device, personal computer (306), transmits during the on-line interview, over the data communications network (100) from the first client device (102) to the second client device (308), the media stream (106) of content from the interviewee (302). Simultaneously with the transmitting of the media stream from the interviewee, the first client device (306) records the media stream, that is, the content (316) from the interviewee, in a media file (318) on the first client device.

Meanwhile during the on-line interview, the second client device (308) records a media stream of content (322) from the interviewer (304) in a media file (324) on the second client device (308). After the on-line interview, the first client device (306) transmits to the second client device (308) the media file (318) containing the recorded media stream of content (316) from the interviewee (302). This transmission of the media file (318) containing the recorded media stream of content (316) from the interviewee (302) is not a streaming transmission; this is a transmission of a file as, for example, via an email attachment, a transmission via the File Transfer Protocol ('FTP'), or a Telnet transmission.

When the second client device receives the media file (318) containing the recorded media stream of content (316) from the interviewee (302), the second client device merges the recorded media files into a single media file (331) for transmission to viewers of the on-line interview. The single media file contains the merged content (331) from both the interviewer and the interviewee. Typical examples of such merged media files would include both sides of an on-line interview, for example, for a news podcast. The system of FIG. 1 includes a media server (104), typically implemented as a Web server or HTTP server. Such a merged media file (330) is often installed in a directory of the media server as downloadable content from a website. Examples of websites that would typically use such downloadable content as on-line interviews in podcasts include cnn.com, msnbc.com, twit.com, the BBC World Tech Broadcast, extremetech™ by Ziff Davis, skype.com, and others as will occur to those of skill in the art.

The arrangement of client devices, servers, and the network making up the exemplary system illustrated in FIG. 1 are for explanation, not for limitation. Data processing systems useful for formulating multimedia content of an on-line interview according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Formulating multimedia content of an on-line interview in accordance with the present invention is generally implemented with computers, that is, with automated computing machinery. In the system of FIG. 1, for example, all the client devices, servers, and the network are implemented to some extent at least as computers. For further explanation, therefore, FIG. 2 sets forth a block diagram of automated computing machinery comprising an exemplary computer (152) of a type that may be useful as a client device or a telecommunications server in formulating multimedia content of an on-line interview according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a communications application (315), a module of computer program instructions that sets up media streams and transmits multimedia content on the media streams. The communications application (315) may program the computer (152) to function as a telecommunications server, a client device for an interviewee, or a client device for an interviewer. Also stored RAM (168) is a media file (318) containing content (316) from an interviewee, a media file (324) containing content (322) from an interviewer, and a media file (330) containing merged content (331) from an interviewee and an interviewer. The communications application may be a multimodal browser, a teleconferencing application, or another communications application as will occur to those of skill in the art. The communications application may improved to formulate multimedia content of an on-line interview on an interviewee's client device in accordance with the present invention by transmitting during an on-line interview, over a data communications network to an interviewer's client device, a media stream of content from an interviewee; simultaneously with the transmitting of the media stream from the interviewee, recording the media stream from the interviewee in a media file on the interviewee's client device; and transmitting after the on-line interview, from the interviewee's client device to the interviewer's client device, the media file (318) containing the recorded media stream (316) from the interviewee. The communications application may be improved to formulate multimedia content of an interviewer on an interviewer's client device in accordance with the present invention by recording during the on-line interview, in a media file (324) on the interviewer's client device, a media stream of content (322) from the interviewer; receiving after the on-line interview, from the interviewee's client device, a media file (318) containing the recorded media stream (316) from the interviewee; and merging the recorded media files into a single media file (330) on the interviewer's client device for transmission to viewers of the on-line interview. Also stored in RAM (168) is an operating system (154). Operating systems useful formulating multimedia content of an on-line interview according to embodiments of the present invention include UNIX™, Linux™, Microsoft XP™, AIX™, IBM's i5/OS™, and others as will occur to those of skill in the art. The operating system (154), the communications application (315), and the media files 318, 324, 330) in the example of FIG. 2 are shown in RAM (168), but readers will recognize that many components of such software typically are stored in non-volatile memory also, such as, for example, on a disk drive (170).

Figure 2:
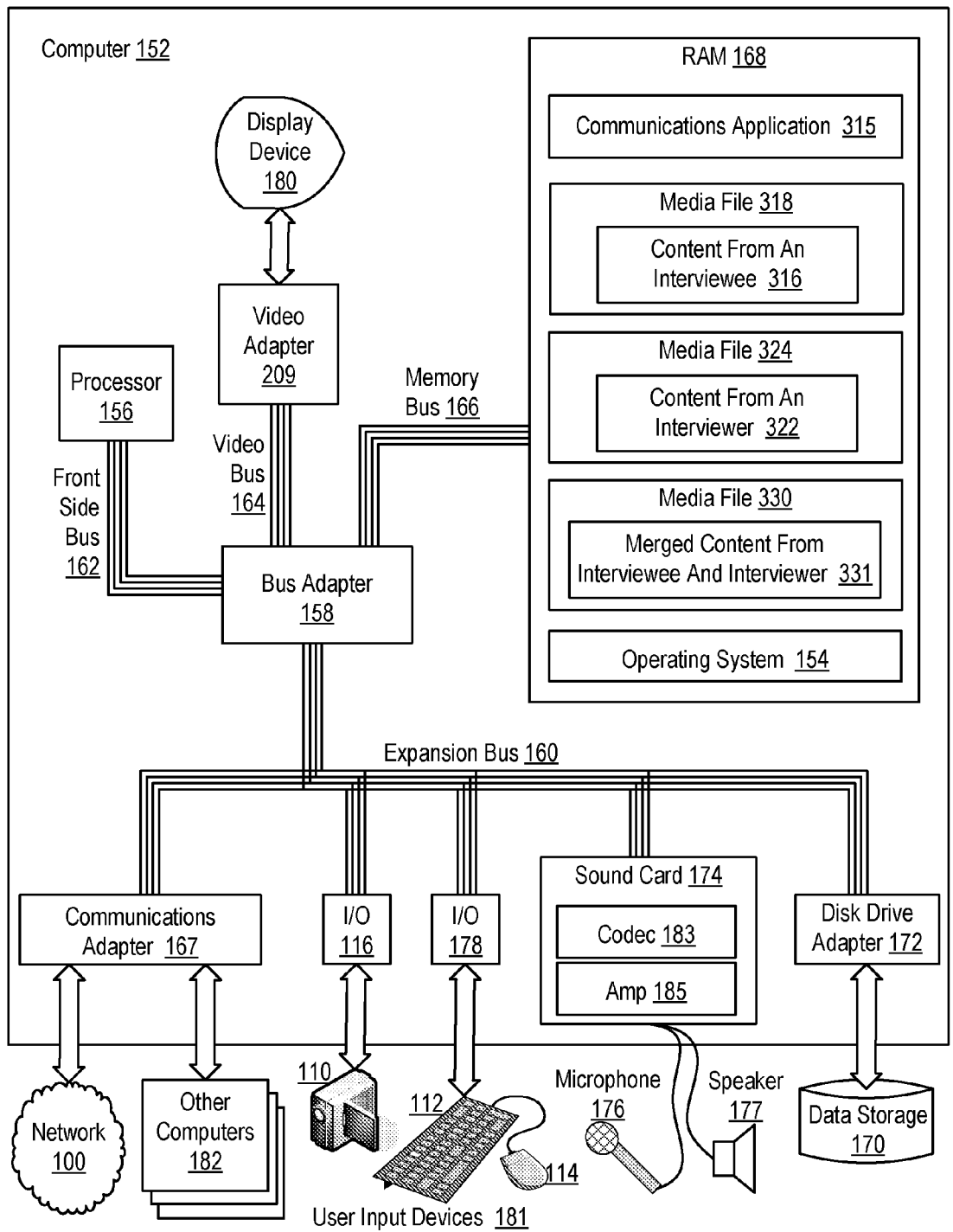
FIG. 2 sets forth a block diagram of automated computing machinery comprising an exemplary computer of a type that may be useful as a client device or a telecommunications server in formulating multimedia content of an on-line interview according to embodiments of the present invention.

The computer (152) of FIG. 2 includes a disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for formulating multimedia content of an on-line interview according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes input/output ('I/O') adapters (116, 178). I/O adapters implement user-oriented input/output through, for example, software drivers and computer hardware for controlling output to display devices such as computer display screens, as well as user input from user input devices (181) such as keyboards (112), mice (114), and video cameras (110). The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for formulating multimedia content of an on-line interview according to embodiments of the present invention include modems for wired dial-up communications, Ethernet (IEEE 802.3) adapters for wired data communications network communications, and 802.11 adapters for wireless data communications network communications.

Figure 3:
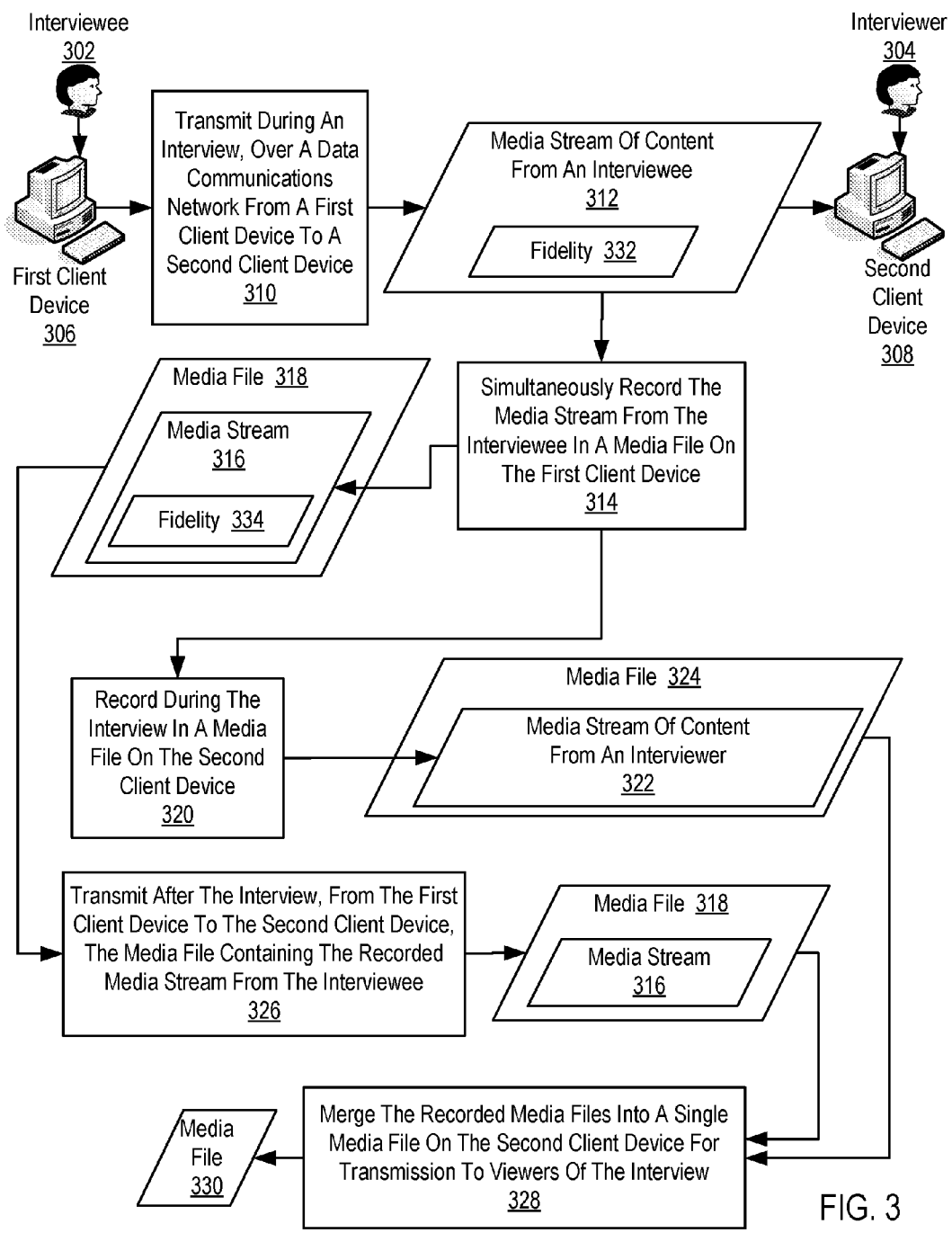
FIG. 3 sets forth a flow chart illustrating an exemplary method for formulating multimedia content of an on-line interview according to embodiments of the present invention.

For further explanation, FIG. 3 sets forth a flow chart illustrating an exemplary method for formulating multimedia content of an on-line interview according to embodiments of the present invention. The method of FIG. 3 is implemented with servers, client devices, and at least one data communications network as described above with regard to FIGS. 1 and 2. The method of FIG. 3 includes transmitting (310) during an on-line interview, over a data communications network from a first client device (306) to a second client device (308), a media stream of content (312) from an interviewee (302). The media stream of content from an interviewee may be implemented as, for example, a VOIP transmission or an IPTV transmission. The method of FIG. 3 also includes recording (314), simultaneously with the transmitting of the media stream from the interviewee, the media stream (316) from the interviewee (302) in a media file (318) on the first client device (306). The method of FIG. 3 also includes recording (320) during the on-line interview in a media file (324) on the second client device (308), a media stream of content (322) from an interviewer (304).

In the method of FIG. 3, the media stream (316) from the interviewee (302) as recorded on the first client device (306) is characterized by a fidelity (334), and the media stream (312) from the interviewee (302) as received at the second client device is characterized by a fidelity (332). Fidelity is a measure of the accuracy of a streamed or recorded depiction of the on-line interview, measured, for example, in terms of signal distortion levels and signal to noise ratios. The form of the media stream may be audio or video encoded according various specifications from the Moving Picture Expert Group, MPEG-1, MPEG-2, MPEG-3, and so on, or any of several other encoding formats or file types: GSM (Global System for Mobile communications), WMA (Windows Media Audio), RealAudio™, SWA (Macromedia Shockwave Audio™), SWF (Macromedia Flash™), and so on. Both the encoding and the network protocols used to transmit the media file typically are 'lossy,' tolerant of missing packets and the like, favoring speed over absolute integrity of the transmission. Transmission over the network to the second client devices exposes the media stream to much more risk of distortion and noise than the short path from an input device directly to computer storage on the first client device. The fidelity (334) of the media stream (316) as recorded on the first client device (306) therefore is higher than the fidelity (332) of the media stream (312) as received on the second client device (308).

The method of FIG. 3 also includes transmitting (326) after the on-line interview, from the first client device (306) to the second client device (308), the media file (318) containing the recorded media stream (316) from the interviewee (302). The method of FIG. 3 also includes merging (328) the recorded media files (318, 324) into a single media file on the second client device (308) for transmission to viewers of the on-line interview. This illustrates one of the benefits of the invention. The media file (318) can be transmitted with a lossless protocol, such as, for example, TCP, FTP, or Telnet, so that it's high fidelity is preserved through the transmission. The interviewer saw on the second client device the streamed version of the content from the interviewee during the interview, with all its noise, dropped packets, and other distortion, but the form of the content from the interviewee that will now be merged and made available to other viewers for download includes the high fidelity form of the content from the interviewee that was recorded on the first client device during the interview. The merged content also includes the content from the interviewer that was recorded, also with high fidelity, on the second client device during the interview, so that the overall fidelity of the merged content is high.

Figure 4:
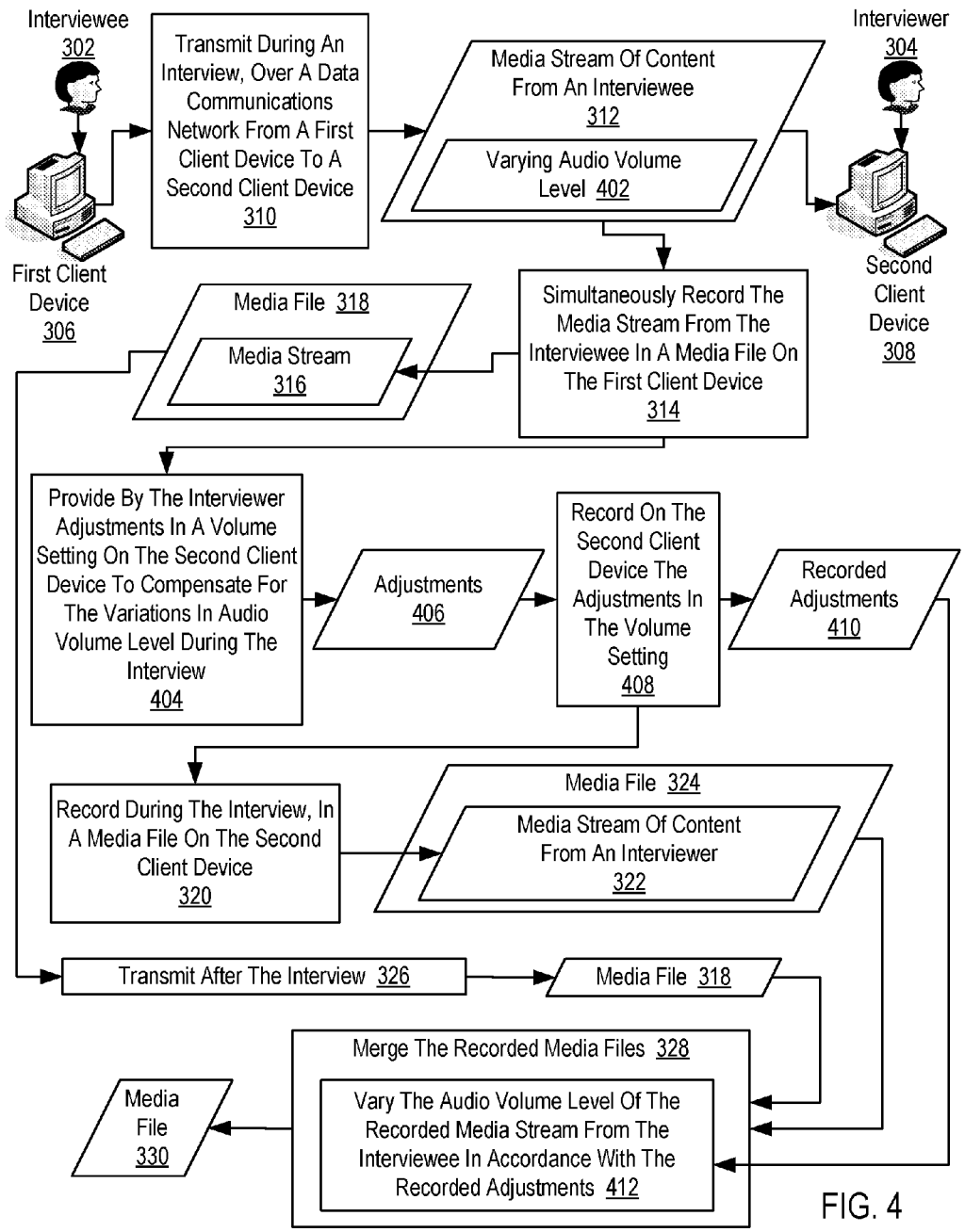
FIG. 4 sets forth a flow chart illustrating a further exemplary method for formulating multimedia content of an on-line interview according to embodiments of the present invention.

For further explanation, FIG. 4 sets forth a flow chart illustrating a further exemplary method for formulating multimedia content of an on-line interview according to embodiments of the present invention. The method of FIG. 4 is similar to the method of FIG. 3, including as it does transmitting (310) during an on-line interview, over a data communications network from a first client device (306) to a second client device (308), a media stream of content (312) from an interviewee (302); recording (314), simultaneously with the transmitting of the media stream from the interviewee, the media stream (316) from the interviewee (302) in a media file (318) on the first client device (306); recording (320) during the on-line interview in a media file (324) on the second client device (308), a media stream of content (322) from an interviewer (304); transmitting (326) after the on-line interview, from the first client device (306) to the second client device (308), the media file (318) containing the recorded media stream (316) from the interviewee (302); and merging (328) the recorded media files (318, 324) into a single media file on the second client device (308) for transmission to viewers of the on-line interview—all of which operate in a similar manner as described above with regard to FIG. 3.

In addition to these characteristics of the method of FIG. 3, however, in the method of FIG. 4, the media stream (312) from the interviewee as received at the second client device (304) is characterized by an audio volume level (402) that varies during the on-line interview. The method of FIG. 4 also includes providing (404) by the interviewer (304) adjustments (406) in a volume setting on the second client device (308) to compensate for the variations in audio volume level (402) during the on-line interview. The method of FIG. 4 also includes recording (408) on the second client device (308) the adjustments (406) in the volume setting. In the method of FIG. 4, merging (328) the recorded media files (318, 324) includes varying (412) the audio volume level of the recorded media stream from the interviewee in accordance with the recorded adjustments (410). The audio volume level (402) of the media stream (312) from the interviewee may vary, for example, because the interviewee moves toward or away from the microphone, turns her head while speaking, and so on, for many reasons as will occur to those of skill in the art. By varying the audio volume level of the recorded media stream (322) from the interviewee according to the recorded compensating adjustments (410) from the interviewer, the method of FIG. 4 provides a merged media file (330) with, not only a high fidelity of content from the interviewee, but also a steady audio volume level for the content from the interviewee.

Figure 5:
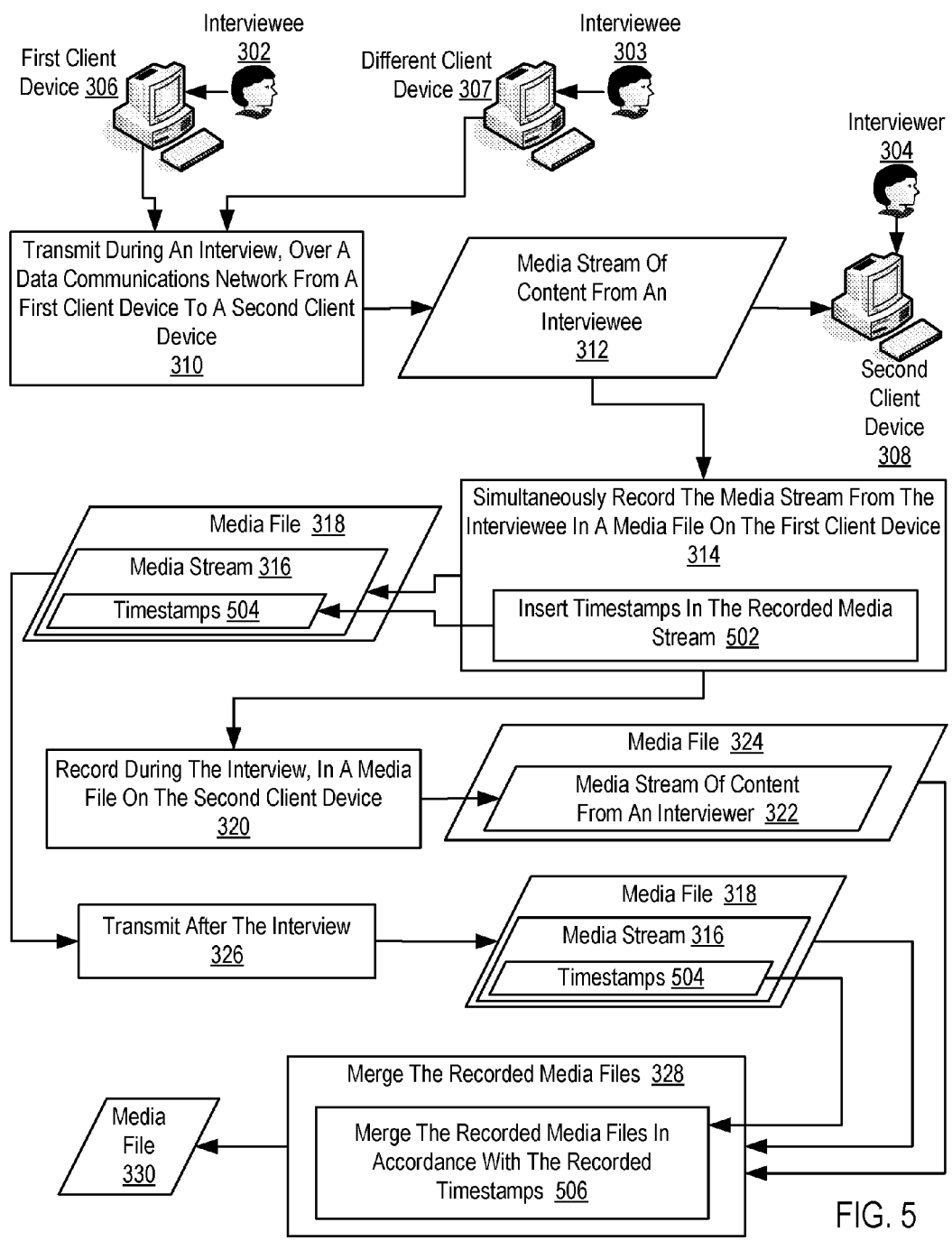
FIG. 5 sets forth a flow chart illustrating a further exemplary method for formulating multimedia content of an on-line interview according to embodiments of the present invention.

For further explanation, FIG. 5 sets forth a flow chart illustrating a further exemplary method for formulating multimedia content of an on-line interview according to embodiments of the present invention. The method of FIG. 5 is similar to the method of FIG. 3, including as it does transmitting (310) during an on-line interview, over a data communications network from a first client device (306) to a second client device (308), a media stream of content (312) from an interviewee (302); recording (314), simultaneously with the transmitting of the media stream from the interviewee, the media stream (316) from the interviewee (302) in a media file (318) on the first client device (306); recording (320) during the on-line interview in a media file (324) on the second client device (308), a media stream of content (322) from an interviewer (304); transmitting (326) after the on-line interview, from the first client device (306) to the second client device (308), the media file (318) containing the recorded media stream (316) from the interviewee (302); and merging (328) the recorded media files (318, 324) into a single media file on the second client device (308) for transmission to viewers of the on-line interview—all of which operate in a similar manner as described above with regard to FIG. 3.

In addition to these characteristics of the method of FIG. 3, however, in the method of FIG. 5, the on-line interview includes more than one interviewee (302, 303), where the interviewees (302, 303) join the on-line interview at different times on different client devices (306, 307). In the method of FIG. 5, recording (314) the media stream (312) from the interviewee includes inserting (502) timestamps in the recorded media stream. A timestamp is a data element that contains computer data representing a particular date and time, for example, 05042007 021417 to represent May 4, 2007, at 2:14 a.m. and 17 seconds. Such timestamps are inserted in the media stream at regular intervals to support synchronizing the data stream with other streams with which it may be merged. In the method of FIG. 5, merging (328) the recorded media files (318, 324) includes merging (506) the recorded media files (318, 324) in accordance with the recorded timestamps (504). In this way, content (316, 322) from both media files (318, 324) is automatically aligned so that it is properly sequenced even for interviewees who joined the interview at different times.

Exemplary embodiments of the present invention are described largely in the context of a fully functional distributed computer system for formulating multimedia content of an on-line interview. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention. It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of formulating multimedia content of an on-line interview, the method comprising:
    transmitting during the on-line interview, over a data communications network from a first client device to a second client device, a media stream of multimedia content from an interviewee, wherein the multimedia content includes audio data and video data, and wherein the media stream from the interviewee as received at the second client device is characterized by an audio volume level that varies during the on-line interview;
    simultaneously with the transmitting of the media stream from the interviewee, recording the media stream from the interviewee in a media file on the first client device;
    recording during the on-line interview in a media file on the second client device, a media stream of multimedia content from an interviewer, wherein the multimedia content includes audio data and video data;
    providing by the interviewer adjustments in a volume setting on the second client device to compensate for the variations in audio volume level during the on-line interview;
    recording on the second client device the adjustments in the volume setting;
    transmitting after the on-line interview, from the first client device to the second client device, the media file containing the recorded media stream from the interviewee; and
    merging the recorded media files into a single media file on the second client device for transmission to viewers of the on-line interview, wherein the single media file includes multimedia content with audio data and video data, including varying the audio volume level of the recorded media stream from the interviewee in accordance with the recorded adjustments.

2. The method of claim 1 wherein:
    the media stream from the interviewee as recorded on the first client device is characterized by a fidelity;
    the media stream from the interviewee as received at the second client device is characterized by a fidelity; and
    the fidelity of the media stream as recorded on the first client device is higher than the fidelity of the media stream as received on the second client device.

3. The method of claim 1 wherein the media stream of multimedia content from an interviewee includes audio data received via a Voice Over Internet Protocol ('VOIP') transmission.

4. The method of claim 1 wherein the media stream of multimedia content from an interviewee comprises an Internet Protocol TeleVision ('IPTV') transmission.

5. The method of claim 1 wherein:
    the on-line interview includes more than one interviewee, wherein the interviewees join the on-line interview at different times on different client devices;
    recording the media stream from the interviewee further comprises inserting timestamps in the recorded media stream; and
    merging the recorded media files further comprises merging the recorded media files in accordance with the recorded timestamps.

6. Apparatus for formulating multimedia content of an on-line interview, the apparatus comprising a computer processor, a computer memory operatively coupled to the computer processor, the computer memory containing computer program instructions capable of:
    transmitting during the on-line interview, over a data communications network from a first client device to a second client device, a media stream of multimedia content from an interviewee, wherein the multimedia content includes audio data and video data, and wherein the media stream from the interviewee as received at the second client device is characterized by an audio volume level that varies during the on-line interview;
    simultaneously with the transmitting of the media stream from the interviewee, recording the media stream from the interviewee in a media file on the first client device;
    recording during the on-line interview in a media file on the second client device, a media stream of multimedia content from an interviewer, wherein the multimedia content includes audio data and video data;
    providing by the interviewer adjustments in a volume setting on the second client device to compensate for the variations in audio volume level during the on-line interview;
    recording on the second client device the adjustments in the volume setting;
    transmitting after the on-line interview, from the first client device to the second client device, the media file containing the recorded media stream from the interviewee; and
    merging the recorded media files into a single media file on the second client device for transmission to viewers of the on-line interview, wherein the single media file includes multimedia content with audio data and video data, including varying the audio volume level of the recorded media stream from the interviewee in accordance with the recorded adjustments.

7. The apparatus of claim 6 wherein:
    the media stream from the interviewee as recorded on the first client device is characterized by a fidelity;
    the media stream from the interviewee as received at the second client device is characterized by a fidelity; and
    the fidelity of the media stream as recorded on the first client device is higher than the fidelity of the media stream as received on the second client device.

8. The apparatus of claim 6 wherein the media stream of multimedia content from an interviewee includes audio data received via a Voice Over Internet Protocol ('VOIP') transmission.

9. The apparatus of claim 6 wherein the media stream of multimedia content from an interviewee comprises an Internet Protocol TeleVision ('IPTV') transmission.

10. The apparatus of claim 6 wherein:
    the on-line interview includes more than one interviewee, wherein the interviewees join the on-line interview at different times on different client devices;

recording the media stream from the interviewee further comprises inserting timestamps in the recorded media stream; and merging the recorded media files further comprises merging the recorded media files in accordance with the recorded timestamps.

11. A computer program product for formulating multimedia content of an on-line interview, the computer program product disposed in a computer readable, recordable, non-transitory medium, the computer program product comprising computer program instructions capable of:

transmitting during the on-line interview, over a data communications network from a first client device to a second client device, a media stream of multimedia content from an interviewee, wherein the multimedia content includes audio data and video data, and wherein the media stream from the interviewee as received at the second client device is characterized by an audio volume level that varies during the on-line interview;

simultaneously with the transmitting of the media stream from the interviewee, recording the media stream from the interviewee in a media file on the first client device;

recording during the on-line interview in a media file on the second client device, a media stream of multimedia content from an interviewer, wherein the multimedia content includes audio data and video data;

providing by the interviewer adjustments in a volume setting on the second client device to compensate for the variations in audio volume level during the on-line interview;

recording on the second client device the adjustments in the volume setting;

transmitting after the on-line interview, from the first client device to the second client device, the media file containing the recorded media stream from the interviewee; and merging the recorded media files into a single media file on the second client, wherein the single media file includes multimedia content with audio data and video data, including varying the audio volume level of the recorded media stream from the interviewee in accordance with the recorded adjustments.

12. The computer program product of claim 11 wherein:
the media stream from the interviewee as recorded on the first client device is characterized by a fidelity;
the media stream from the interviewee as received at the second client device is characterized by a fidelity; and
the fidelity of the media stream as recorded on the first client device is higher than the fidelity of the media stream as received on the second client device.

13. The computer program product of claim 11 wherein the media stream of multimedia content from an interviewee includes audio data received via a Voice Over Internet Protocol ('VOIP') transmission.

14. The computer program product of claim 11 wherein the media stream of multimedia content from an interviewee comprises an Internet Protocol TeleVision ('IPTV') transmission.

15. The computer program product of claim 11 wherein:
the on-line interview includes more than one interviewee, wherein the interviewees join the on-line interview at different times on different client devices;
recording the media stream from the interviewee further comprises inserting timestamps in the recorded media stream; and
merging the recorded media files further comprises merging the recorded media files in accordance with the recorded timestamps.

\* \* \* \* \*